(12) United States Patent
Fisher et al.

(10) Patent No.: US 8,627,466 B2
(45) Date of Patent: *Jan. 7, 2014

(54) ALERT MESSAGE CONTROL OF SECURITY MECHANISMS IN DATA PROCESSING SYSTEMS

(75) Inventors: Lee Adam Fisher, Aylesbury (GB); Jack Robert Arron Clark, Aylesbury (GB); Nicholas Edward Baines, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/245,799

(22) Filed: Sep. 26, 2011

(65) Prior Publication Data

US 2012/0017278 A1  Jan. 19, 2012

Related U.S. Application Data

(63) Continuation of application No. 10/386,530, filed on Mar. 13, 2003, now Pat. No. 8,042,178.

(51) Int. Cl.
*H04L 29/06* (2006.01)

(52) U.S. Cl.
USPC ............... 726/22; 726/23; 726/24; 726/25

(58) Field of Classification Search
None
See application file for complete search history.

(56) References Cited

U.S. PATENT DOCUMENTS

| | | | |
|---|---|---|---|
| 5,440,723 | A | 8/1995 | Arnold et al. |
| 5,987,610 | A | 11/1999 | Franczek et al. |
| 6,064,751 | A | 5/2000 | Smithies et al. |
| 6,073,142 | A | 6/2000 | Geiger et al. |
| 6,460,050 | B1 | 10/2002 | Pace et al. |
| 6,704,874 | B1 | 3/2004 | Porras et al. |
| 6,801,999 | B1 | 10/2004 | Venkatesan et al. |
| 6,842,709 | B2 | 1/2005 | Borg |
| 6,990,591 | B1 | 1/2006 | Pearson |
| 7,028,338 | B1 | 4/2006 | Norris et al. |
| 7,506,155 | B1 | 3/2009 | Stewart et al. |
| 2001/0007993 | A1 | 7/2001 | Wu |
| 2002/0046275 | A1 | 4/2002 | Crosbie et al. |
| 2004/0153665 | A1* | 8/2004 | Browne ........................ 713/201 |

\* cited by examiner

*Primary Examiner* — Benjamin Lanier
(74) *Attorney, Agent, or Firm* — Patent Capital Group

(57) ABSTRACT

An authenticated secure network communication link is established between an alert message generating computer 2 and a destination data processing system 6. The alert message sent specifies a risk threat level and a suggested countermeasure amongst other data. The destination computer 6 automatically responds to the alert message as controlled by its local response configuration parameters to trigger security actions of one or more security mechanisms, such as malware scanners, firewall scanners, security policy managers and the like.

18 Claims, 5 Drawing Sheets

ALERT MESSAGE a) RISK ASSESSMENT LEVEL
b) DATE
c) TIME
d) THREATNAME
e) THREAT INFORMATION URL
f) THREAT TRANSPORT TYPE
g) CONTENT FILTER

1. LOW
2. RESERVED
3. LOW-PROFILED
4. RESERVED
5. MEDIUM
6. RESERVED
7. MEDIUM ON WATCH
8. RESERVED
9. HIGH
10. RESERVED

FIG. 4

RESPONSE CONFIGURATION PARAMETERS

| RISK ASSESSMENT LEVEL | TRIGGER SUGGESTED COUNTER MEASURE | GENERATE ADMINISTRATION NOTIFICATION | DOWNLOAD NEW DAT |
|---|---|---|---|
| 1. | X | ✓ | X |
| 2. | X | ✓ | X |
| 3. | X | ✓ | ✓ |
| 4. | X | ✓ | ✓ |
| . | . | . | . |
| . | . | . | . |
| . | . | . | . |
| 9. | ✓ | ✓ | ✓ |
| 10. | ✓ | ✓ | ✓ |

FIG. 5

ALERT MESSAGE CONTROL OF SECURITY MECHANISMS IN DATA PROCESSING SYSTEMS

RELATED APPLICATION

This Application is a continuation (and claims the benefit of priority under 35 U.S.C. §120) of U.S. application Ser. No. 10/386,530, filed Mar. 13, 2003, entitled "ALERT MESSAGE CONTROL OF SECURITY MECHANISMS IN DATA PROCESSING SYSTEMS," Inventor(s) Lee Adam Fisher, et al., issued as U.S. Pat. No. 8,042,178 on Oct. 18, 2011. The disclosure of the prior application is considered part of (and is incorporated by reference in) the disclosure of this application.

BACKGROUND OF THE INVENTION

1. Field of the Invention

This invention relates to the field of data processing systems. More particularly, this invention relates to the control of security mechanisms, such as, for example, malware scanners, internet firewalls, email scanners etc.

2. Description of the Prior Art

Security threats to data processing systems are becoming increasingly common and increasingly potentially damaging. Accordingly, it is known to provide one or more security mechanisms for carrying out security actions within data processing systems. Examples of such security mechanisms are malware scanners, email scanners, internet firewalls and the like. To at least some extent these security mechanisms are reactive in the sense that as new security threats emerge these security mechanisms require configuration changes or updates in order to deal with the new security threats. As an example, when a new computer virus is discovered, this may be of a type which is not identified and can evade the existing computer virus scanners. These computer virus scanners need updating with an additional computer virus signature for the newly released computer virus before they can identify and counteract that new computer virus.

A trend within the field of security threats to data processing systems is that such threats to data processing systems can propagate and become serious at an increasingly rapid rate. As an example, computer virus writers may try to specifically design their computer viruses to spread rapidly such that they can cause significant damage before the providers of computer virus scanning programs can react and develop the appropriate necessary updated computer virus signature files and the data processing systems users download and install those new computer virus signatures. A modern mass mailer computer virus may propagate at such a rate that a significant and damaging world-wide outbreak of a computer virus can arise within a matter of a few tens of minutes after the computer virus is first released.

It is known to provide alert messaging to users in the form of emails to inform them of newly arising computer security threats. As an example, a computer virus scanner provider may provide a service for registered users whereby, if they so wish, they will receive notification emails when the computer virus scanner provider becomes aware of a new computer virus outbreak. The user upon reading this email notification can then decide what security measures they wish to take for their own system to deal with the newly arising threat.

A problem with the existing alerting mechanisms is that they require the user to open, read and act upon the alerting email message. This takes a finite amount of time that may be too long to forestall a damaging security breach. Furthermore, computer virus writers are aware of the issue of security counter measure response times and tend to release their computer viruses at times of day when they believe a large number of users will be out of office hours such that security counter measures will not be taken until the following day by which time significant damage will have been caused. Computer viruses may be released during the night-time of the target victim users or perhaps at the start of a holiday weekend for the target victim users.

SUMMARY OF THE INVENTION

Viewed from one aspect the present invention provides a computer program product for controlling computers to control at least one security mechanism of a data processing apparatus, said computer program product comprising:

link establishing code operable to establish an authenticated secure network communication link between said data processing apparatus and a remote alert message generating computer;

alert message generating code operable to generate an alert message with said remote alert message generating computer;

alert message transferring code operable to transfer said alert message from said remote alert message generating computer to said data processing apparatus via said authenticated secure network communication link; and triggering code operable to automatically trigger at least one security action by said at least one security mechanism of said data processing apparatus in response to said alert message as configured by user programmable response configuration parameters of said data processing apparatus.

The present technique recognises the inadequacy in the current alert messaging techniques with respect to the increasing need for rapid countermeasures and addresses this problem by providing that the alert message itself automatically triggers security actions at the user's computer in accordance with a response configuration set up by the user. This arrangement is resistant to spoofing or hacking in that an authenticated secure communication link is used for passing the alert messages. Furthermore, the technique enables a rapid automatic security action response to be achieved when desired and yet provides user programmable response configuration parameters such that individual users can tailor the degree to which they wish to allow security actions to be automatically triggered. It may be that particular policies or configuration of a user mean that certain automated security actions are not wanted whereas others would be wanted.

Whilst it would be appreciated that the authenticated secure network communication link could take a variety of different forms, it is particularly convenient to use an internet link, such as a http protocol communication link.

The authenticated secure network communication link could take a variety of different forms but preferably employs authentication by exchanging data using public and private key encryption. One or both parties to the communication may wish to authenticate the recipient before sending or receiving the alert message or acting upon the alert message.

The security mechanisms in which security actions may be automatically triggered can take a variety of different forms including a network malware scanner (malware including computer viruses, worms, Trojans, banned files, banned images, etc), an email scanner, a network internet firewall, a network security policy manager, a desktop interne firewall and a desktop malware scanner.

It will be appreciated that the alert message may carry a data payload of a variety of different types. This data payload can be advantageously small since it generally represents control data rather than large data files, such as virus signature libraries. In preferred embodiments of the invention, the alert message can include one or more of a risk assessment level indicator, a date of issue of the alert message, a time of issue of the alert message, a name identifying a threat addressed by the alert message, a pointer to an internet location where additional information concerning the alert message may be found, a transport type associated with the alert message threat and configuration data permitting a temporary countermeasure to be established.

In the case of an alert message including configuration data permitting temporary countermeasures to be established, the security action which may be automatically triggered includes automatically implementing the temporary countermeasure. This is highly advantageous in that, for example, when a new security threat arises out of office hours, an alert message including a suggested temporary countermeasure may be sent out to users and automatically trigger that temporary countermeasure to be put in place without the need for the user to be present or take any action themselves. One example might be a new internet access based attempt to gain unauthorised access to computer systems via an internet port. This threat could be temporarily counteracted by sending out an automated action that will trigger the internet firewall computer programs to block that communication port until a proper permanent countermeasure can be put in place.

In preferred embodiments of the invention, when the alert message includes a risk level indicator, then the programmable response configuration parameters can allow a user to specify what levels of risk would be allowed to automatically trigger different types of response. As an example, a security threat classified by the software provider as of a high risk in the alert message may be allowed to automatically trigger the installation of a temporary countermeasure and the downloading and updating of, for example, computer virus signature files. In contrast, an alert message which specifies a threat risk of low may be permitted only to trigger generation of an alerting notification to the user that such an alert message has been received. The user can then decide on their own whether to undertake farther security actions depending upon their perception of the degree of threat posed.

Whilst it will be appreciated that this technique might be used between a single alert message generator and a single data processing system user, the technique is particularly useful when the alert messages are sent to a plurality of users as may be stored within a list of destination computers. In such an environment many software users can benefit from the rapid alert message generation and automatic security action triggering centrally provided by the software provider.

Whilst it will be appreciated that the current technique involves operations upon different computers, e.g. upon the alert message generation computer and the destination data processing system, aspects of the invention are also the individual computers within the overall system. It is quite possible that the alert message generating computer could be located in one country and the data processing systems upon which automatic triggering of security actions is required is in a different country.

A further aspect of the invention provides a method of controlling at least one security mechanism of a data processing apparatus, said method comprising the steps of:

establishing an authenticated secure network communication link between said data processing apparatus and a remote alert message generating computer;

generating an alert message with said remote alert message generating computer;

transferring said alert message from said remote alert message generating computer to said data processing apparatus via said authenticated secure network communication link; and automatically triggering at least one security action by said at least one security mechanism of said data processing apparatus in response to said alert message as configured by user programmable response configuration parameters of said data processing apparatus.

A still further aspect of the invention provides apparatus for controlling at least one security mechanism of a data processing apparatus, said apparatus comprising:

link establishing logic operable to establish an authenticated secure network communication link between said data processing apparatus and a remote alert message generating computer;

alert message generating logic operable to generate an alert message with said remote alert message generating computer;

alert message transferring logic operable to transfer said alert message from said remote alert message generating computer to said data processing apparatus via said authenticated secure network communication link; and triggering logic operable to automatically trigger at least one security action by said at least one security mechanism of said data processing apparatus in response to said alert message as configured by user programmable response configuration parameters of said data processing apparatus.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 is a diagram schematically illustrating the content of an example alert message;

FIG. 5 is a diagram schematically illustrating response configuration parameters at a destination computer.

DESCRIPTION OF THE PREFERRED EMBODIMENTS

Figure 1:
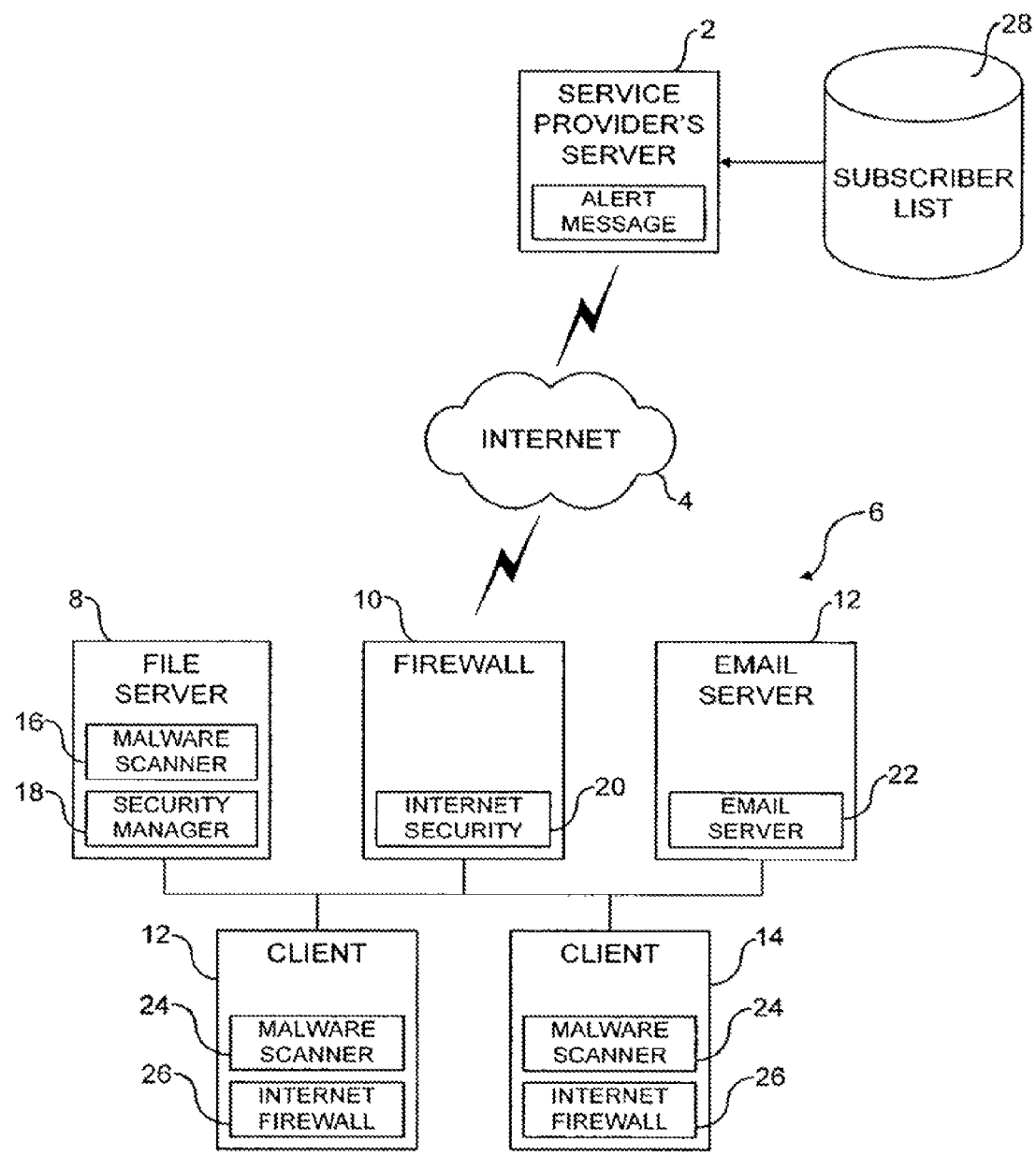
FIG. 1 schematically illustrates an alert message generating computer connected via the internet to a data processing system upon which it is desired to automatically trigger security actions.

FIG. 1 illustrates a service provider's server computer 2 coupled via the internet 4 to a user's data processing system 6. The service provider can provide a variety of different security mechanisms which may be implemented by the data processing system user. As an example, if the data processing system 6 includes a file server 8, a firewall server 10, an email server 12 and a plurality of client computers 12, 14, then the file server 8 includes a malware scanner 16 and a network security policy manager (such as for example ePolicy Manager as produced by Networks Associates Inc). The firewall server 10 include a network internet firewall computer program 20, the email server 12 includes an email scanner computer program 22 and the client computers 12, 14 include desktop malware scanners 24 and desktop internet firewall computer programs 26.

The software provider will typically employ staff who continuously monitor for the emergence of new security threats such that countermeasures may be rapidly provided to their customers. The security threats could take a variety of different forms and may be applicable to one or more than one of their different security mechanism products 16, 18, 20, 22, 24 and 26. The service provider's server 2 has access to a subscriber list database 28 which includes internet addresses to which a http protocol data transfer may be made to carry an alert message produced when a new security threat is identified. Customers may pay a fee to be on the subscriber list 28 and receive such alert messages, or alternatively such alert messages may be provided free to all registered users, or other arrangements.

Figure 2:
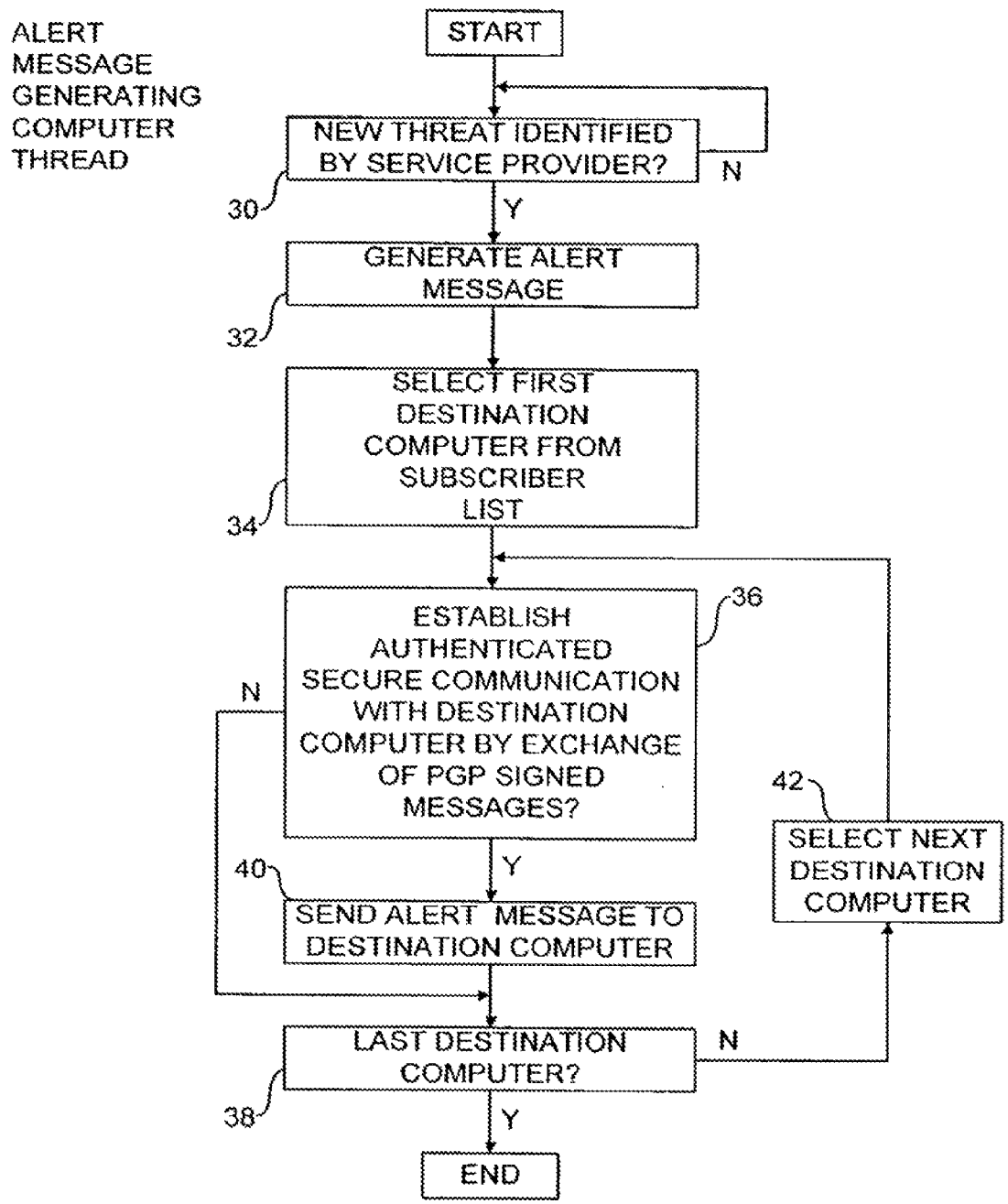
FIG. 2 is a flow diagram schematically illustrating a computer program thread operating on the alert message generating computer.

FIG. 2 schematically illustrates a computer program thread which may be operating on the alert message generating computer (service provider's server 2). At step 30, the system waits until a new threat is identified by the service provider. It will be appreciated that this step will in practice be performed by a human who receives a customer report of some unusual activity or a suspicious file submission or the like. Step 30 may be considered as the person initiating the alert message generating operation. At step 32 the alert message is generated. As previously mentioned, the alert message will typically be composed of information identified by a security analyst who will classify the security threat and suggest a temporary countermeasure as well as other actions. Parts of the alert message may be automatically formed, such as the date and time of the alert message. The authentication signing of the alert message is automated as part of step 32.

At step 34 the first destination computer to which the alert message is to be sent is selected from the subscriber list 28. At step 36 an authenticated secure communication link is established with the destination computer by an exchange of PGP signed messages. This exchange may be one directional or two directional. As an example, the destination computer may wish to authenticate that the alert message is from the genuine service provider, but it may be less important for the service provider to authenticate that the message is being sent to an authenticated destination computer. It is however important that the authenticated secure communication link is resistant to spoofing as this automated triggering of security actions should itself be resistant to being used as a security vulnerability. If the authentication at step 36 fails, then processing proceeds to step 38 If the authentication at step 36 succeeds, then processing proceeds to step 40 at which the alert message is sent to the destination computer. The alert message may be encrypted as well as being signed.

At step 38 a determination is made as to whether or not the alert message has yet been attempted to be sent to the last destination computer within the subscriber list 28. If this test indicates that there are further destination computers to which the alert message is to be sent, then processing proceeds to step 42 at which the next destination computer is selected before processing returns to step 36. If the last destination computer has been subject to an attempt to send the alert message, then the thread terminates.

Figure 3:
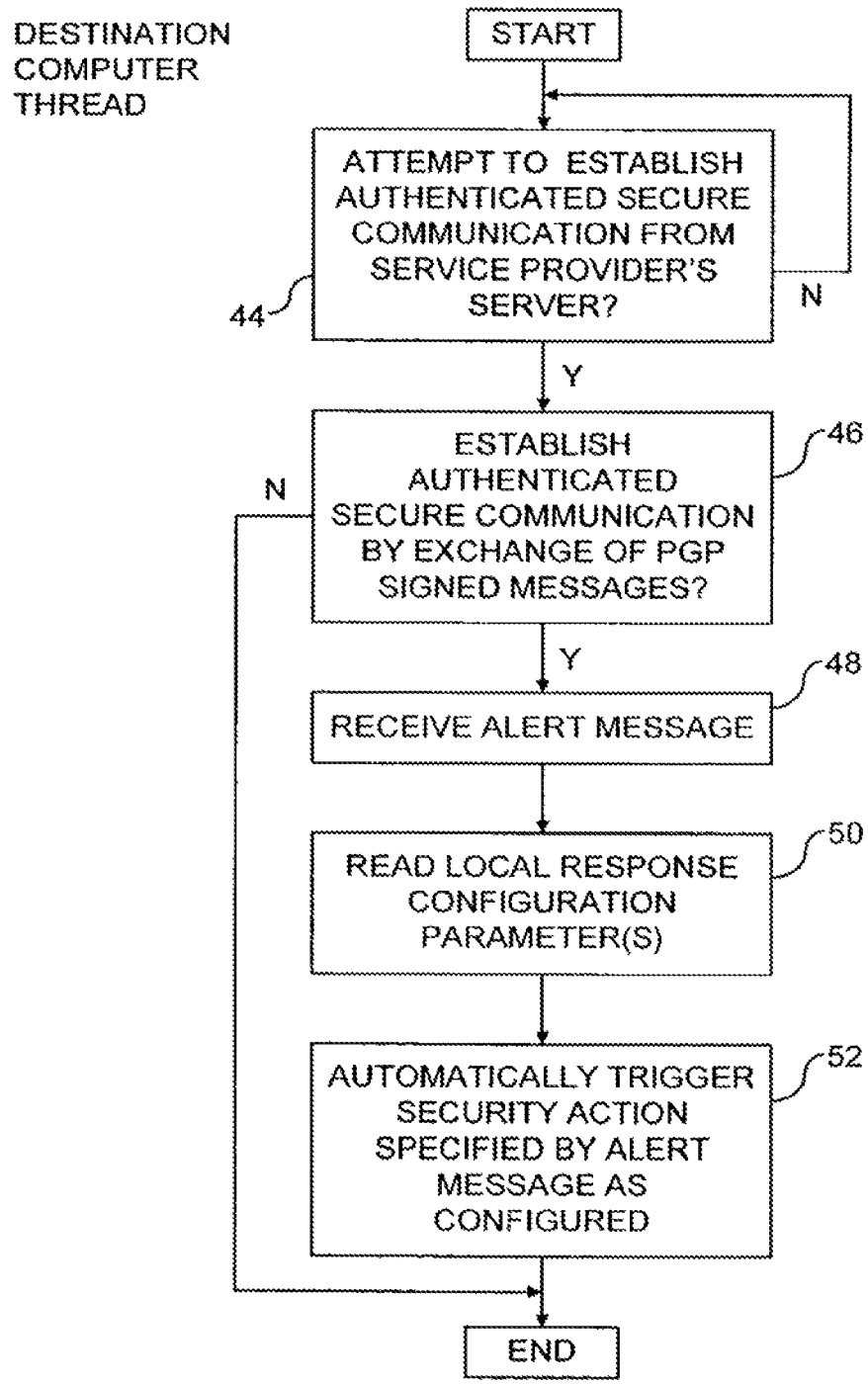
FIG. 3 is a flow diagram schematically illustrating a computer program thread operating on a destination computer.

FIG. 3 is a flow diagram schematically illustrating a computer program thread executing on a destination computer to automatically respond to alert messages. At step 44 the system monitors for an attempt to establish an authenticated secure communication from the service provider's server 2. This may involve listening at a particular internet port for data originating from a particular source.

When such an attempt to establish an authenticated secure communication link is detected, processing proceeds to step 46 at which the communication link attempt is authenticated by an exchange of PGP signed messages as previously discussed. If this authentication fails, then processing of the thread terminates. If the authentication succeeds, then processing proceeds to step 48 at which the alert message from the service provider's server 2 is received. When the alert message has been received it is decrypted and read.

At step 50 the local response configuration parameters applicable to the read alert message are themselves read for the destination computer concerned. These local response configuration parameters are user programmable. As an example, when this automatically triggered security action mechanism is first installed on the destination computer, the user may be prompted to specify which risk assessment levels they wish to permit to automatically trigger countermeasure actions, which to trigger software updates, which to trigger administrator notifications etc. The appropriate configuration parameters for the alert message risk level and security mechanism concerned are read at step 50.

At step 52 the security action specified by the alert message in accordance with the local response configuration parameters is automatically triggered. This security action may be, for example, blocking of emails with a certain title using the email scanner 22, blocking of internet access to particular internet ports with the network internet firewall 20 or the desktop internet firewall 26, quarantining or other triggered action in response to detection of a particular file by the network malware scanner 16 or the desktop malware scanner 24 or a change in a networkwide security parameter such as applying malware scanning to a new file type by the security policy manager 18.

FIG. 4 illustrates the example contents of an alert message. It will be appreciated that this is only one example and a variety of different data may be contained within the alert message. The data illustrated includes a risk assessment level, a date of the alert message, a time of the alert message, a threat name of the security threat addressed by the alert message, a URL specifying where further information regarding the threat may be found, data specifying the transport type for the threat, e.g. email, internet, file transfer etc, and a content filter which can be considered to specify a temporary countermeasure that may be applied. The content filter in the case of an email scanner could be an email title. The content filter in the case of a security action within the security manager would be data encoding an action to be automatically triggered by the security manager 18 if permitted by the user's configuration rather than a content filter as understood in the context of an email scanner. The countermeasure specified in the content filter varies depending upon the security mechanism to which it is directed.

FIG. 5 schematically illustrates response configuration parameters which may be user programmable at the destination computer. In this example, for each risk assessment level the configuration parameters specify which of a plurality of different automatically triggered actions are to be permitted if specified by an alerting message. In the example illustrated, it will be seen for risk assessment levels indicative of a high degree of threat more of the automatically triggered actions are permitted compared with risk assessment levels indicative of a low level of risk. The response configuration parameters allow different computer users to tailor how they will respond to the alert messages.

Figure 6:
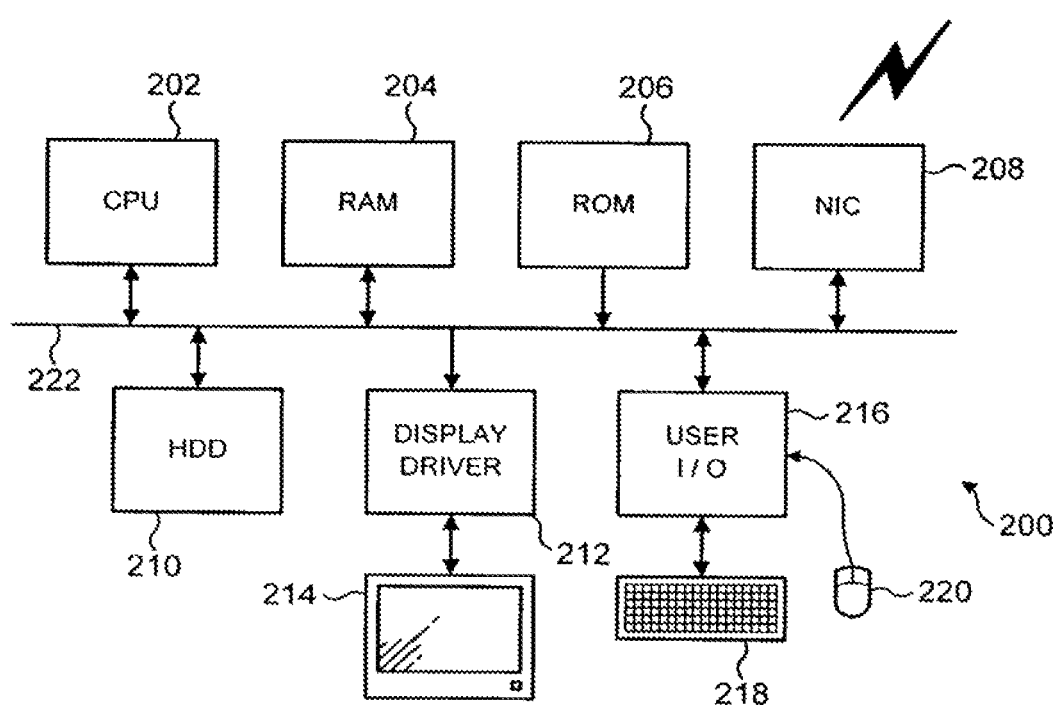
FIG. 6 schematically illustrates a general purpose computer of the type which can be used to implement different parts of the above techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method, comprising:
 establishing a secure link between a computer and a server, which communicated an alert message indicative of a security threat;
 authenticating the alert message;
 evaluating local response configuration parameters previously set for the computer by a user; and
 executing a countermeasure action for the security threat based on the local response configuration parameters that outline which actions are to be taken based on a risk level indicator provided in the alert message; wherein:
 the alert message comprises a content filter specifying a temporary countermeasure;
 if the risk level is high, the temporary countermeasure is to be automatically taken until a permanent countermeasure is subsequently taken to resolve the security threat; and
 the temporary countermeasure is automatically taken only if permitted by the local response configuration parameters by the user.

2. The method of claim 1, wherein a database is accessed in order to identify an Internet address for an HTTP data transfer associated with the alert message.

3. The method of claim 1, wherein the temporary countermeasure action includes a selected one of a group of temporary countermeasure actions, the group consisting of:
 a) initiating a software update;
 b) notifying an administrator;
 c) blocking certain e-mails;
 d) blocking Internet access for a particular port;
 e) quarantining a particular file; and
 f) executing malware scanning at the computer.

4. The method of claim 1, wherein the alert message includes a selected one of a group of elements, the group consisting of:
 a) a date of the alert message;
 b) a time of the alert message;
 c) a threat name of the security threat associated with the alert message;
 d) a uniform resource locator (URL) identifying a location for information regarding the security threat;
 e) data specifying a transport type for the security threat.

5. The method of claim 1, further comprising:
 monitoring a particular port for security threat data that originates from a particular source.

6. The method of claim 1, wherein the establishing of the secure link is performed via an exchange of encrypted messages that can be signed by the computer and the server.

7. The method of claim 1, wherein the secure link is authenticated by exchanging data associated with public and private key encryption.

8. An apparatus, comprising:
 a processor; and
 a memory, wherein the apparatus is configured for:
 establishing a secure link between the apparatus and a server, which communicated an alert message indicative of a security threat;
 authenticating the alert message;
 evaluating local response configuration parameters previously set for the apparatus by a user; and
 executing a countermeasure action for the security threat based on the local response configuration parameters that outline which actions are to be taken based on a risk level indicator provided in the alert message; wherein:
 the alert message comprises a content filter specifying a temporary countermeasure;
 if the risk level is high, the temporary countermeasure is to be automatically taken until a permanent countermeasure is subsequently taken to resolve the security threat; and
 the temporary countermeasure is automatically taken only if permitted by the local response configuration parameters.

9. The apparatus of claim 8, wherein a database is accessed in order to identify an Internet address for an HTTP data transfer associated with the alert message.

10. The apparatus of claim 8, wherein the temporary countermeasure action includes a selected one of a group of temporary countermeasure actions, the group consisting of:
 a) initiating a software update;
 b) notifying an administrator;
 c) blocking certain e-mails;
 d) blocking Internet access for a particular port;
 e) quarantining a particular file; and
 f) executing malware scanning at the apparatus.

11. The apparatus of claim 8, wherein the alert message includes a selected one of a group of elements, the group consisting of:
 a) a date of the alert message;
 b) a time of the alert message;
 ic) a threat name of the security threat associated with the alert message;
 d) a uniform resource locator (URL) identifying a location for information regarding the security threat; and
 e) data specifying a transport type for the security threat.

12. The apparatus of claim 8, further comprising: monitoring a particular port for security threat data that originates from a particular source.

13. The apparatus of claim 8, wherein the establishing of the secure link is performed via an exchange of encrypted messages that can be signed by the apparatus and the server.

14. The apparatus of claim 8, wherein the secure link is authenticated by exchanging data associated with public and private key encryption.

15. A computer program product including a non-transitory computer medium for performing operations, comprising:
- establishing a secure link between a computer and a server, which communicated an alert message indicative of a security threat;
- authenticating the alert message;
- evaluating local response configuration parameters previously set for the computer by a user; and
- executing a countermeasure action for the security threat based on the local response configuration parameters that outline which actions are to be taken based on a risk level indicator provided in the alert message; wherein:
  - the alert message comprises a content filter specifying a temporary countermeasure;
  - if the risk level is high, the temporary countermeasure is to be automatically taken until a permanent countermeasure is subsequently taken to resolve the security threat; and
  - the temporary countermeasure is automatically taken only if permitted by the local response configuration parameters.

16. The computer program product of claim 15, the operations further comprising:
- identifying an Internet address for an HTTP data transfer associated with the alert message.

17. The computer program product of claim 15, the operations further comprising:
- exchanging encrypted messages between the computer and the server.

18. The computer program product of claim 15, wherein the secure link is authenticated by exchanging data associated with public and private key encryption.

* * * * *

UNITED STATES PATENT AND TRADEMARK OFFICE
CERTIFICATE OF CORRECTION

PATENT NO. : 8,627,466 B2
APPLICATION NO. : 13/245799
DATED : January 7, 2014
INVENTOR(S) : Lee Adam Fisher et al.

Page 1 of 1

It is certified that error appears in the above-identified patent and that said Letters Patent is hereby corrected as shown below:

In the Claims

In column 8, line 60, in claim 11, delete "ic)" and insert -- c) --, therefor.

Signed and Sealed this
Twenty-ninth Day of April, 2014

Michelle K. Lee
*Deputy Director of the United States Patent and Trademark Office*